United States Patent [19]

Carle

[11] 4,256,448
[45] Mar. 17, 1981

[54] ROLLER DIE

[75] Inventor: George E. Carle, Derby, Conn.

[73] Assignee: USM Corporation, Farmington, Conn.

[21] Appl. No.: 66,020

[22] Filed: Aug. 13, 1979

Related U.S. Application Data

[63] Continuation of Ser. No. 884,742, Mar. 9, 1978, abandoned.

[51] Int. Cl.³ .............................................. B29F 3/012
[52] U.S. Cl. .................................. 425/367; 264/175; 264/176 R; 425/143; 425/186; 425/192 R; 425/194; 425/327; 425/376 B; 425/466; 425/DIG. 235
[58] Field of Search ................................ 425/143–144, 425/149, 327, 367, 366, 224, 192 R, 194, 376 B, 376 R, 466, DIG. 235, 186; 264/175, 176 R, 40.1, 40.3, 40.6

[56] References Cited

U.S. PATENT DOCUMENTS

| | | | |
|---|---|---|---|
| 3,115,672 | 12/1963 | Seanor | 425/367 |
| 3,274,645 | 9/1966 | Chase | 425/367 |
| 3,359,597 | 12/1967 | Bainton | 425/367 |
| 3,366,717 | 1/1968 | Rohaus | 425/144 |
| 3,483,595 | 12/1969 | Matsuoka | 425/367 |
| 3,543,333 | 12/1970 | Anders et al. | 264/175 |
| 3,694,120 | 9/1972 | Walton | 425/149 |
| 3,895,898 | 7/1975 | Theysohn | 425/327 |
| 3,947,201 | 3/1976 | Ellwood | 425/466 |
| 4,043,731 | 8/1977 | Kratzmann et al. | 425/366 |
| 4,117,054 | 9/1978 | Salo | 264/40.1 |

FOREIGN PATENT DOCUMENTS

| | | |
|---|---|---|
| 173665 | 1/1922 | United Kingdom . |
| 341686 | 1/1931 | United Kingdom . |
| 404486 | 1/1934 | United Kingdom . |
| 741632 | 12/1955 | United Kingdom . |
| 1218592 | 1/1971 | United Kingdom . |
| 1351246 | 4/1974 | United Kingdom . |
| 1391993 | 4/1975 | United Kingdom . |
| 1526686 | 9/1978 | United Kingdom . |
| 1534905 | 12/1978 | United Kingdom . |

*Primary Examiner*—Jeffery R. Thurlow
*Attorney, Agent, or Firm*—Donald N. Halgren; Vincent A. White

[57] ABSTRACT

A roller die apparatus includes a pair of cylinder rolls which are rotatably and obliquely yieldably mounted on a frame disposed on the output end of a plastic extruding machine. The rolls are biasedly restrained in the frame to permit the obtusely directed movement thereof with respect to the direction of extruded plastic flow. This non-orthogonal movement of the cylindrical roller members facilitates adjustment and cleaning thereof.

4 Claims, 2 Drawing Figures

ROLLER DIE

This is a continuation of application Ser. No. 884,742 filed Mar. 9, 1978 now abandoned.

BACKGROUND OF THE INVENTION

1. Field of the Invention

This invention relates to extruding machines, and more particularly to machines having roller dies between which extruded plastic material is formed into sheets.

2. Prior Art

An extruder-roller die may comprise an extruding device in which a plastic or rubber material is mixed and propelled along the length of a cylinder or barrel, through a discharge orifice, and introduced between cooperating die rolls which form the material to the finished dimensions. The material is discharged into the area between the rolls under heavy pressure.

It has been found in practice that as the material is introduced into the opening between the die rolls, excessively high pressures may be exerted on the rolls themselves, which may occur at a time when the extruder is delivering to the rolls a volume of material in excess of what the calender rolls can deliver as output. This same excessive pressure can also occur due to an unusually high viscosity of the material being formed. This could build up an accumulation of material which the rolls could not immediately handle, and which would require the shutting down of the entire apparatus. The shutdown would include the attendant removal of the excess material and cleaning of the equipment after moving portions of the equipment away from the extruder, on rails or wheels, before it can be reassembled and put back into productive use. This machine downtime reduces efficiency and increases maintenance costs. The need for portions of the machine to be mounted on rails or wheels also adds to the cost thereof. An attempt at improving the roller die machines is shown in U.S. Pat. No. 3,115,672 where the roller dies move orthogonally apart to permit cleaning and inspection thereof, which orthogonal movement, however, inherently puts a higher strain on the machinery.

Accordingly, the present invention provides a new and improved arrangement for supporting, adjusting, and releasing or backing-off a pair of rolls in a roll support frame, attached to an extruder machine.

It is an object of the present invention to provide an improved roll support and release mechanism.

It is a further object of the present invention to provide an improved retraction mechanism for die rolls in an extruding machine.

SUMMARY OF THE INVENTION

The present invention involves the relationship of a pair of rolls to a frame on a machine such as an extruder or calender wherein the rolls can be retracted in obtusely oriented guides, permitting a wider gap between the rolls for gauge changes of the rolled product, or for ease of cleaning or repairing the rolls or other parts of the machinery.

The rolls are biasedly held to the desired pressure nip by an arrangement of regulatable hydraulic cylinders secured to the roll support.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
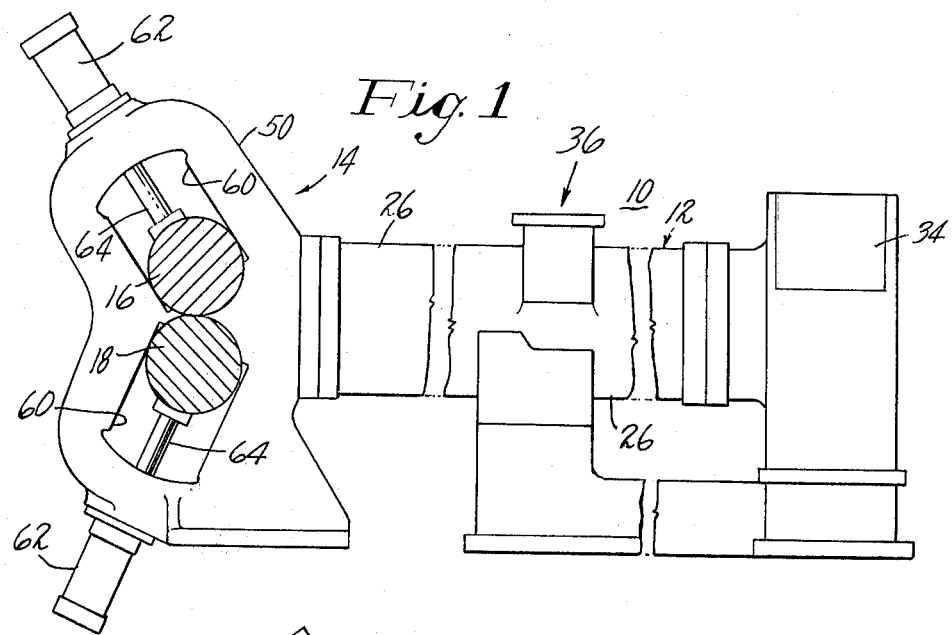
FIG. 1 is a side elevation, partially in section, of an extruder-roller die machine embodying the invention.
Figure 2:
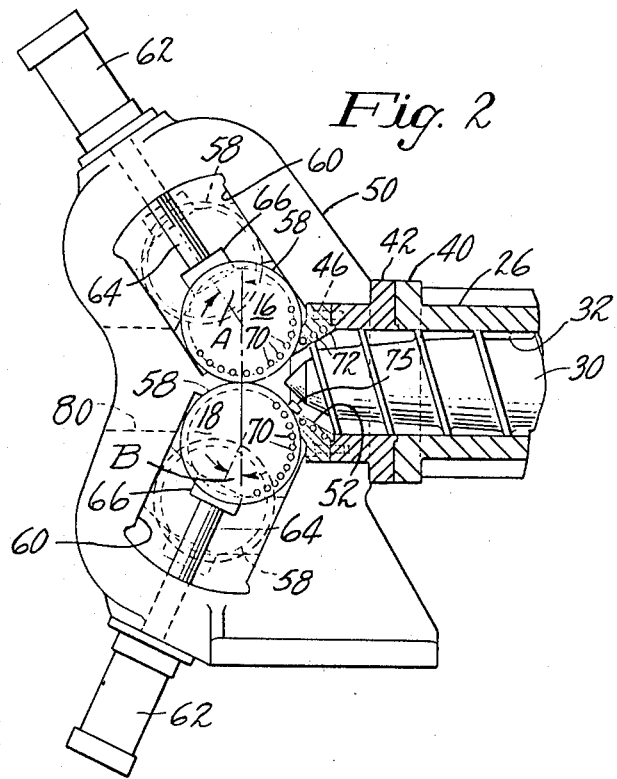
FIG. 2 is a fragmentary and enlarged view, similar to FIG. 1, of the extruder and the calender rolls.

Referring now to the drawings in detail, and in particular to FIG. 1, there is shown an extruder roller-die machine 10. The extruder roller-die machine 10 comprises an extruder 12 and a roller die head 14, having an upper roll 16 and a lower roll 18 cooperating therein to form a pressure nip therebetween. The extruder 12 includes a barrel 26 having an extruder screw 30, as shown in FIG. 2, rotatably disposed in a longitudinal bore 32. The extruder screw 30 is driven through a suitable motor and gearing, arranged in a housing 34 on one end of the extruder 12.

A feed hopper 36 is disposed intermediate the extruder 12 providing means for feeding material to be extruded, into the longitudinal bore 32. A flange 40 is disposed about the output end (the left-hand end) of the extruder 12, as shown in FIGS. 1 and 2. The flange 40 provides a means for attaching a head adapter 42 to the extruder 12. The roller-die head 14 comprises a transition section 46 which is disposed intermediate the head adapter 42 and a pair of roll support frames 50 having portions which are generally arranged in parallel (only one parallel frame member 50 being shown). The transition section 46 has a passageway 52 extending therethrough. The passageway 52 is generally circular in cross-section where it abuts the head adapter 42, and it transforms to an elongated oval at its discharge opening, where it empties the extruded material to the receiving area of the upper and lower rolls, 16 and 18.

The upper and lower rolls, 16 and 18, form the pressure nip between one another immediately downstream of the discharge opening in the transition section 46. The upper and lower rolls, 16 and 18, are journalled at their ends, in an annular arrangement of bearings 58. The bearings 58 are each slidingly disposed in an elongated slot 60 in each calender frame 50. The bearings 58 are arranged one each around each end of the upper and lower rolls 16 and 18. The bearings 58 are also each biasedly arranged with hydraulic cylinder 62. Each hydraulic cylinder 62 has a rod 64 extending therefrom with a shoe plate 68 rotatively engaging its associated bearing 58 on its distal end thereof. Each of the rolls, 16 and 18, has a pair of hydraulic cylinders 62 through which regulatable pressurization or depressurization of each respective pair of the hydraulic cylinders 62 by a proper pressure circuit, not shown, permits a transverse movement in either one or both the upper and lower rolls, 16 and 18, in a plane defined by their respective slots 60. The plane of transverse movement of each of the upper and lower rolls, 16 and 18, is oblique to the vertical plane by an angle A and an angle B, respectively, as shown in FIG. 2. The angles A and B may vary from about 15° up to about 60°, the preferable angle being about 30°. The transverse movement of the upper and lower rolls, 16 and 18, is also oblique to the longitudinal axis of the barrel 26 and, may be acute with respect threto.

Each roll, 16 and 18, may be rotated by conventional drive means, not shown. Each roll, 16 and 18, as well as the transition section 46, may have an array of heat transfer passageways 70 and 72, extending therethrough. The heat transfer passageways, 70 and 72, may be used for heating or cooling the machine elements, and are arranged with proper conduits for supplying and discharging the heat transfer fluid as is well known in the art. The hydraulic cylinders 62 may each contain a sensing and control device 75, such as a linear transducer or pressure device, or the like, to detect or measure the pressure of the extrudate at the respective rolls, 16 and 18. The control device 75 may act through appropriate electrical or hydraulic circuitry to reduce or increase the speed of revolution of the rolls, 16 and 18, or the speed of the extruder screw 30. The control device 75 may sense the pressure of the extrudate to also alter the pressure supplied to the cylinders 62 to permit a larger gap between the rolls, 16 and 18. The control device 75 may also be temperature sensitive to control the heat transfer through the rolls, 16 and 18, or the transition section 46.

In operation of the machine 10, the extruder screw 30 is rotatably driven, and unprocessed material, such as plastic or rubber or the like, is fed into the feed hopper 36. This material is processed by the screw 30, where it passes through the head adapter 42, and is discharged through the passageway 52 in the transition section 46 to the nip between the upper and lower rolls, 16 and 18, which form the material into a sheet of desired thickness and width. When it is desired to change materials running through the present machine 10, a complete teardown thereof is not necessary such as required in existing machinery used for the same purpose. Each roll, 16 and 18, may be transversely withdrawn by depressurizing the respective set of hydraulic cylinders 62 permitting retraction of the rods 64 and hence guided movement of each bearing 58 in its associated slot 60 in the die roll frame 50. The final slug of the first material, which was not discharged, may then be easily withdrawn from the bore 32 or the passageway 52 in the transition section 46, through the top or bottom of the calender frame 50 or through a passageway 80 between the parallel portions of the frame members 50 and between upper and lower rolls, 16 and 18. The extruder screw 30 may also be withdrawn through the passageway 80 after removal of the transition section 46, after the upper and lower rolls, 16 and 18, are withdrawn to their outermost positions. During operation of the extrusion process, reactive forces on the upper and lower rolls, 16 and 18, results in the die roller frame 50 and the barrel 26, not just a force acting on the hydraulic cylinders 62 themselves or on the rolls, which without benefit of the obliquely arranged upper and lower rolls, 16 and 18, might otherwise cause deformity or damage therein.

Thus, there has been described a novel apparatus, such as for extruding or calendering, having roller dies or calenders which when loaded, better share that load with the frame of the machine, and which roller dies or calenders are obliquely adjustable to permit changes in thickness of extruded material output, or to permit simple cleaning of the machine and removal of other allied equipment such as an extruding screw.

Though the invention has been described with a certain degree of particularity, the appended claims are intended to be interpreted as exemplary only, and not in a limiting sense.

I claim:

1. A roller die arrangement for an extrusion machine having an extrusion screw therein, said roller die arrangement comprising:
   a pair of cooperating rolls which between them define a nip for receiving and processing any material passed therebetween; and
   a support means mounted on the outlet of said extrusion machine for supporting said cooperating rolls, said support means including adjustment means to permit transverse movement of said cooperating rolls with respect to one another in said support means, said transverse movement of said cooperating rolls also being oblique to the direction of material being extruded from said extrusion screw to change the characteristics of said nip therebetween.

2. A roller die machine as recited in claim 1 wherein at least one of said cooperating rolls has a bearing at each end thereof;
   each bearing being disposed in a guide in said support means,
   said adjustment means utilizable for applying force against each bearing to cause said transverse movement in said cooperating roll.

3. A roller die machine as recited in claim 2, wherein each guide in said support means at opposite ends of said one roll is a slot directing movement of said roll;
   each slot accommodating transverse motion within said support means of said cooperating roll, at an angle which may range from about 15° up to about 60° from the direction of extruded material being supplied to said rolls.

4. A roller die machine as recited in claim 3, wherein the plane of transverse movement of said cooperating roll is 30° from the direction of extruded material being supplied to said rolls.

* * * * *